(12) United States Patent
Mizukoshi et al.

(10) Patent No.: US 7,257,867 B2
(45) Date of Patent: Aug. 21, 2007

(54) CLIP FOR ATTACHING TWO MEMBERS

(75) Inventors: Suguru Mizukoshi, Utsunomiya (JP); Hiroyuki Kato, Utsunomiya (JP)

(73) Assignee: Newfrey LLC, Newark, DE (US)

( * ) Notice: Subject to any disclaimer, the term of this patent is extended or adjusted under 35 U.S.C. 154(b) by 112 days.

(21) Appl. No.: 11/115,297

(22) Filed: Apr. 27, 2005

(65) Prior Publication Data
US 2005/0241118 A1    Nov. 3, 2005

(30) Foreign Application Priority Data
Apr. 28, 2004   (JP)   ............................. 2004-133379

(51) Int. Cl.
*F16B 5/00*   (2006.01)
(52) U.S. Cl. .......................................... 24/297; 24/453
(58) Field of Classification Search .................. 24/453, 24/297, 606, 607; 174/138 D; 403/408.1; 411/508–510, 44–53, 71–75, 77, 340, 341, 411/344

See application file for complete search history.

(56) References Cited
U.S. PATENT DOCUMENTS

| | | | |
|---|---|---|---|
| 3,577,603 A | 5/1971 | Seckerson et al. | 85/5 |
| 3,988,808 A | 11/1976 | Poe et al. | 24/73 |
| 4,716,633 A | 1/1988 | Rizo | 24/453 |
| 5,975,820 A * | 11/1999 | Kirchen | 411/339 |
| 7,017,239 B2 * | 3/2006 | Kurily et al. | 24/297 |
| 2004/0049895 A1 * | 3/2004 | Draggoo et al. | 24/297 |

FOREIGN PATENT DOCUMENTS

| | | |
|---|---|---|
| EP | 0163360 | 12/1985 |
| FR | 1.452.925 | 9/1966 |
| GB | 2 165 298 | 4/1986 |
| JP | 1-87310 | 6/1989 |
| JP | 827022 | 1/1992 |
| JP | 7-12611 | 3/1995 |

* cited by examiner

*Primary Examiner*—James R. Brittain
(74) *Attorney, Agent, or Firm*—Miles & Stockbridge PC

(57) ABSTRACT

A clip for attaching a second member such as an insulator to a first member such as a car body, includes a first clip component attached to the first member and a second clip component working with the first clip component to support the second member. The first clip component has a flange for contacting the first member, a leg extending from the flange for insertion into a mounting hole in the first member, and a shank extending from the flange in a direction opposite to the leg for engaging the second clip component. The second clip component has a flange for contacting the second member, a tube for receiving the shank, and pawls inside the tube. The end of the shank has a portion for engaging the pawls to clamp the second member between the flanges.

2 Claims, 3 Drawing Sheets

CLIP FOR ATTACHING TWO MEMBERS

CROSS-REFERENCE TO RELATED APPLICATION

This application claims the benefit of Japanese Application No. 2004-133379 filed Apr. 28, 2004 (incorporated herein by reference).

BACKGROUND OF THE INVENTION

The present invention relates to a clip for attaching a second member such as an insulator to a first member such as a car body.

An insulator is often attached to a car body, such as in the dashboard, to provide sound proofing or heat insulation to the car, and the insulator is attached using a clip. In Unexamined Utility Model Application Publication 1-87310 (Patent Document 1: Corresponding to Examined Utility Model Application Publication 4-29123), the clip is attached to the insulator beforehand so that the clip with attached insulator can be inserted into a mounting hole in the car body and attached to the car body on an assembly line, thereby simplifying the attachment of an insulator to a car body.

A joining pin is disclosed in Design Registration 827022 (Patent Document 2) for connecting two members. This joining pin is attached to one member and then joined at a predetermined interval to the other member. The clip disclosed in Unexamined Utility Model Application Publication 7-12611 (Patent Document 3: Corresponding to Utility Model Registration 2599660) is used to attach a decorative member such as door trim to a car body. This clip is designed to be able to block the mounting hole for the decorative member.

The clip in Patent Document 1 allows for greater assembly line efficiency because the clip is attached to an insulator beforehand at a site other than an assembly line. However, because of the configuration of the clip, the manner in which the clip is inserted into a mounting hole is critical and relies on the technical expertise of the operator to insert the clip properly into the mounting hole. The joining pin in Patent Document 2 is designed for attachment to one member and then joined at a predetermined interval to another member. This joining pin is not appropriate for attaching an insulator to a car body. The clip in Patent Document 3 is designed to attach a decorative member such as door trim to a car body and seal the mounting hole for the decorative member. As a result, it has an intricate configuration and is not designed to be attached beforehand to the decorative member.

BRIEF DESCRIPTION OF THE INVENTION

The present invention is intended to provide a clip for attaching a second member such as an insulator to a first member such as a car body, the clip being capable of attachment to a second member first, and then to a first member readily and properly, even with the second member already attached.

In a preferred (but non-limiting) embodiment, the present invention is a clip for attaching a second member such as an insulator to a first member such as a car body, wherein the clip comprises a first clip component attached to the first member and a second clip component working with the first clip component to support the second member, wherein the first clip component has a flange for contacting the first member, a leg extending from the flange for insertion into a mounting hole in the first member, and a shank extending from the flange in a direction opposite to the leg for engaging the second clip component, wherein the second clip component has a flange for contacting the second member, a tube for receiving the shank, and an engagement portion formed inside the tube for engaging the shank, and wherein a tip of the shank of the first clip component has an engagement portion for engaging the engagement portion of the second clip component, so as to clamp the second member between the flange of the first clip component and the flange of the second clip component.

In this configuration, the clip is first attached to the second member such as an insulator. For this purpose, the tube of the second clip component is inserted into the mounting hole in the second member, and the tip of the shank of the first clip component is inserted into the tube to clamp the second member between the flange of the first clip component and the flange of the second clip component. The tip of the shank of the first clip component is guided and accommodated by the tube of the second clip component. As a result, the attachment process is simple, and the attachment is reliably performed in a proper position.

Preferably, the engagement portion of the second clip component comprises a pair of pawls formed with an inclined posture so that tips of the pawls approach one another in the insertion direction of the first clip component shank, and wherein the engagement portion of the first clip component is formed as a round plate with a shoulder for engaging the tips of the pawls that have returned to the inclined posture after they have been bent outward. Preferably also, the shank of the first clip component has a small diameter portion near the round plate engagement portion, so the pawls are received in the inclined posture. In this way, the clip does not become deformed even when the second member has been attached for a long time (several years). Moreover, it is preferable that the pawls quickly return to the inclined posture and snap in place when the round plate engagement portion passes between the pawls to spread them. In this way, the operator reliably knows from a click sound that the mounting process has been completed.

It is also preferable that the inner diameter of the tube of the second clip component is formed so as to be about 1.5 times or more the outer diameter of the tip of the shank of the first clip component for easy insertion of the shank. Preferably, the flange of the second clip component is formed in a round plate shape surrounding the tube midway of its height.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
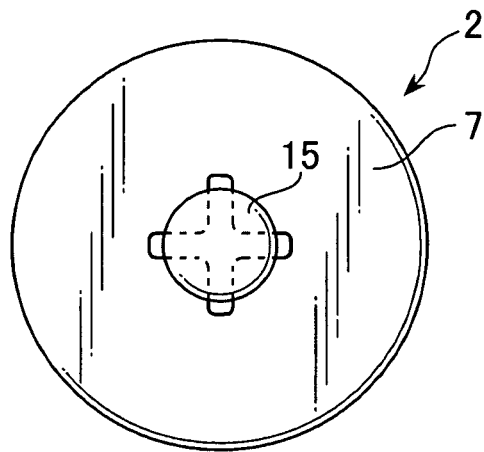
FIG. 1 is a plan view of a first clip component of the clip in a first example of the present invention.

The following is an explanation of a non-limiting embodiment of the present invention with reference to the drawings. The clip 1 in a first example of the present invention includes a first clip component 2 shown in FIG. 1 through FIG. 4 and a second clip component 3 shown in FIG. 5 through FIG. 7. As shown in FIG. 8, the clip 1 is used to join a second member 6 such as an insulator to a first member 5 such as a car body. In this example, each of the first clip component 1 and the second clip component 3 is molded in hard plastic as a single unit. The first member 5 may be a metal panel for a car body and the second member 6 may be a thick sheet of a flexible material such as an insulator appropriate for sound proofing or heat insulation.

The first clip component 2 has a round plate flange 7 for contacting the first member and the second member, a leg 9 extending from the flange 7 for insertion into a mounting hole in the first member, and a shank 10 extending from the flange 7 in a direction opposite to the leg 9 for engaging the second clip component 3. In this example, the leg 9 is a hollow cylinder, in order to save on material costs and reduce weight.

A pair of elastic protrusions 11 project outwardly from the leg 9 and extend axially, opposing one another diametrically. A shoulder 12 is formed on each protrusion 11 to engage an edge region of the mounting hole in the first member. When the leg 9 is inserted into the mounting hole in the first member, the shoulders 12 work with the flange 7 to attach the first clip component 2 to the first member. As indicated by the dotted lines in FIG. 2 and FIG. 4, packing 13 is preferably disposed on the bottom of the flange 7 in order to improve the mounting strength with respect to the first member, increase the adherence to the first member, and protect the surface of the first member from damage.

Figure 2:
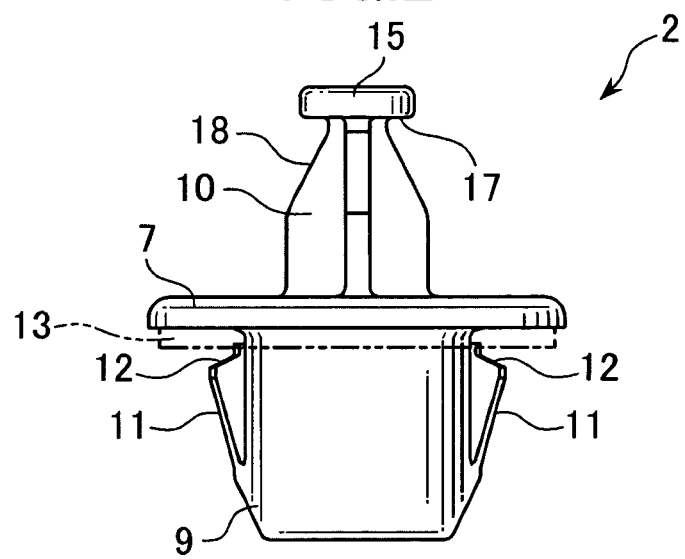
FIG. 2 is a front view of the first clip component in FIG. 1.
Figure 3:
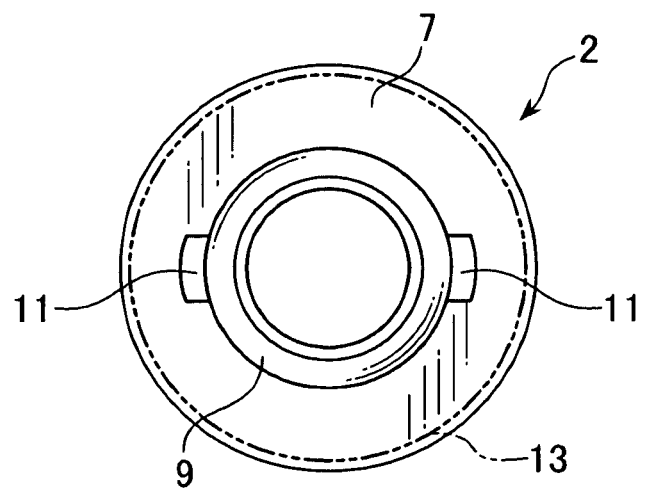
FIG. 3 is a bottom view of the first clip component in FIG. 1.
Figure 4:
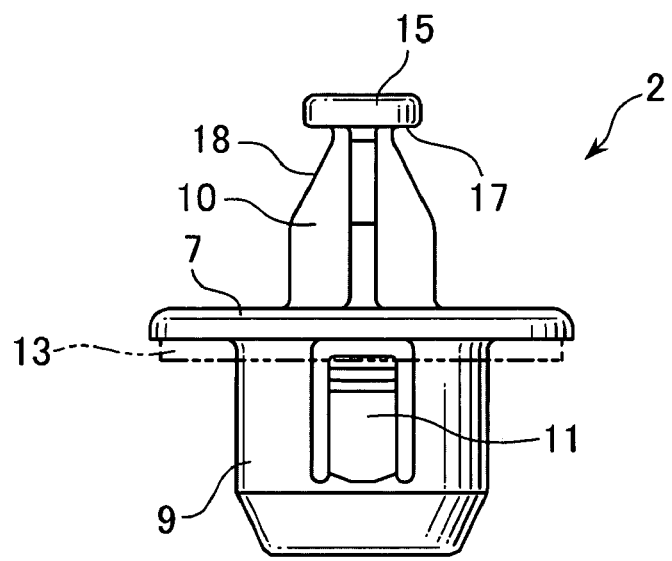
FIG. 4 is a side view of the first clip component in FIG. 1.

The shank 10 can be a simple round cross-section rod or a rod with a cruciform cross-section, for example, as shown in FIG. 2 and FIG. 3, so as to save on material costs and reduce weight while maintaining adequate strength. An engagement portion 15 in the form of a small diameter round head is formed at the tip of the shank 10 and has a shoulder 17 on the bottom surface to engage an engagement portion of the second clip component. Pawls 22 (described below) form the engagement portion of the second clip component 3 and engage the shoulder 17 on the head 15. The shank 10 of the first clip component has a portion 18 near the head 15 that gradually tapers to a small diameter, so the pawls are received thereon in an inclined posture. In this way, the clip does not become deformed, and the engagement force of the pawls is maintained even when the second member has been attached to the first member for a long time (e.g., several years). The pawls, after being bent outward by the head 15, quickly return to the inclined posture and snap in place when the head 15 passes between the pawls. In this way, the operator reliably knows from a click sound that the mounting of the first clip component 2 and the second clip component 3 has been completed.

Figure 5:
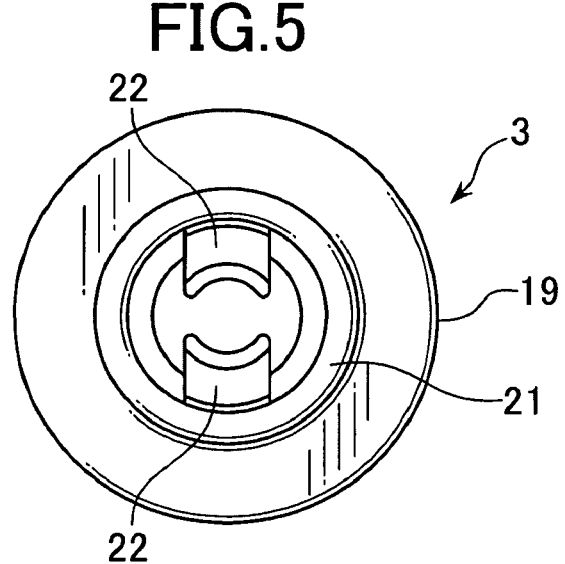
FIG. 5 is a plan view of the second clip component of the clip in the first example of the present invention;.
Figure 6:
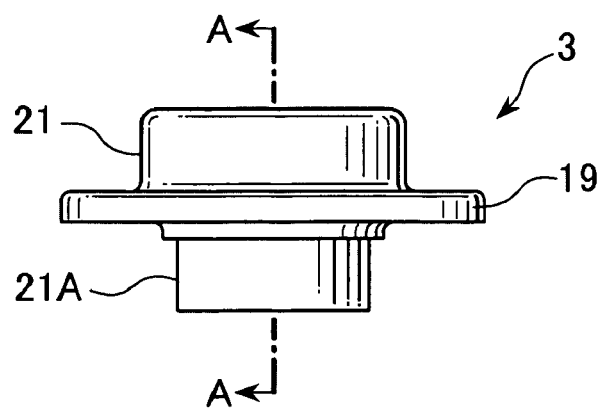
FIG. 6 is a front view of the second clip component in FIG. 5.
Figure 7:
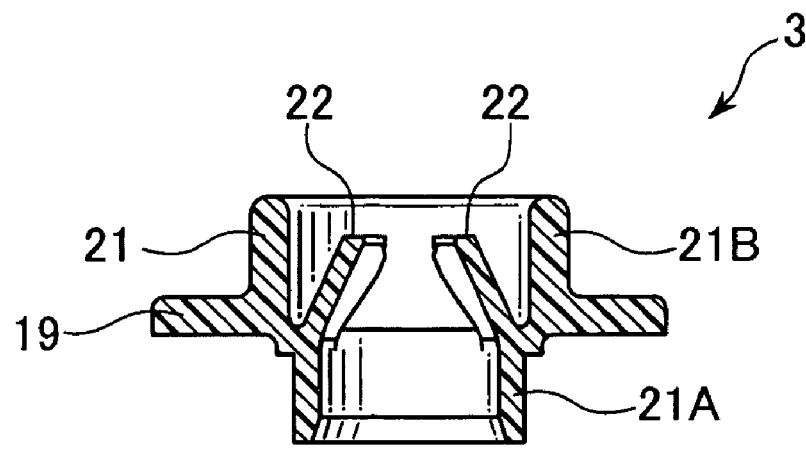
FIG. 7 is a cross-section view of the second clip component from line A-A in FIG. 6.
Figure 8:
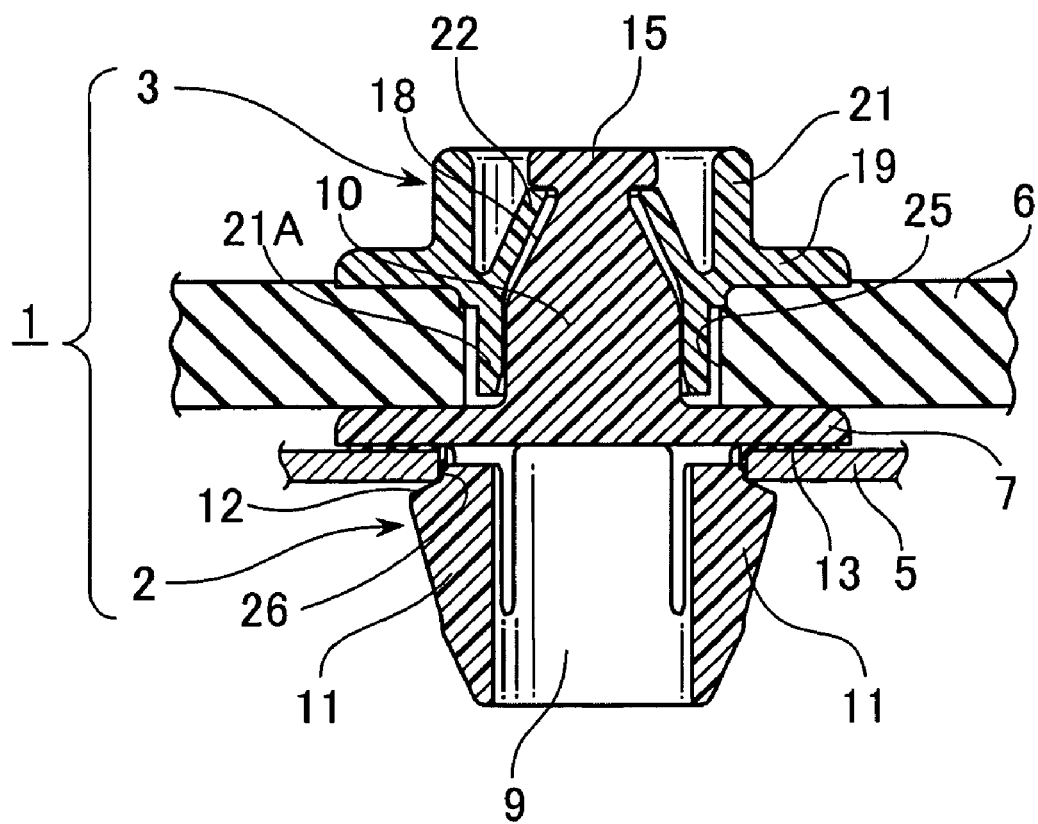
FIG. 8 is a cross-section view of the second clip component attached to the first clip component in the first example of the present invention.

The following is an explanation of the second clip component 3 with reference to FIG. 5 through FIG. 7. The second clip component 3 has a flange 19 for contacting the second member, a tube 21 for receiving the shank 10 of the first clip component 2, and pawls 22 formed inside the tube 21 for engaging the shank 10. As shown in FIG. 6 and FIG. 7, the tube 21 has a guide portion 21A below the flange 19 for receiving the head 15 at the tip of the shank 10 of the first clip component 2, and a main body 21B surrounding the pawls 22 above the flange 19. The entry of the guide portion 21A may be tapered, as shown, and the inner diameter of the guide portion 21A of the tube 21 is preferably about 1.5 times or more the outer diameter of the head 15 of the shank 10 of the first clip component for easy insertion of the shank 10.

FIG. 8 shows a second member 6 such as an insulator attached to a first member 5 such as a car body (e.g., the dashboard) using a clip 1 including a first clip component 2 and a second clip component 3. The clip 1 is preferably attached beforehand to the second member 6 in order to mount the second member 6 on the first member 5, such as a car body on an automotive assembly line. If the second member 6 with the attached clip is moved to the site where the first member 5 is placed, the clip on the second member 6 can be attached to the first member 5 during assembly, thereby reducing the required assembly time and man-hours.

The clip 1 in the present invention is designed for prior attachment to the second member 6. For attachment of the clip 1 to the second member 6, the guide portion 21A of the tube 21 of the second clip component is inserted in the mounting hole 25 in the second member 6, the head 15 at the tip of the shank 10 of the first clip component 2 is inserted into the guide portion 21A of the tube 21, and the first clip component 2 is pushed into the second clip component to spread the pawls 22 and then to seat the tips of the pawls on the shoulder 17 of the head 15, trapping the second component 6 between the flanges 7 and 19. The connection is easy and reliable because the engagement portion 15 of the shank 10 is easily led in by the guide portion 21A of the tube 21.

The second member 6 with the clip 1 attached is moved to the site where the first member 5 is placed. The operator positions the second member 6 over the first member 5 to align the leg 9 of the first clip component 2 with the mounting hole 26 in the first member 5. Next, when the operator inserts the leg 9 of the first clip component 2 into the mounting hole 26 in the first member 5, the protrusions 11 on the leg 9 are compressed and then spread apart underneath the first member 5, and the shoulders 12 engage edge regions of the mounting hole 26. This engagement, as shown in FIG. 8, joins the second member 6 to the first member 5.

The foregoing discussion of the operation of the invention refers to flanges which contact members to be joined. However, it is apparent from the provision of the packing 13, for example, that such contacting is not intended to require direct touching, because there may be an intermediate element, such as a packing, between a flange and a member to be contacted by the flange.

While a preferred embodiment of the invention has been shown and described, it will be apparent that changes can be made without departing from the principles and spirit of the invention, the scope of which is defined in the claims which follow.

What is claimed is:

1. A clip for attaching a second member to a first member, wherein the clip includes a first clip component to be attached to the first member and a second clip component working with the first clip component to support the second member, wherein the first clip component has a flange for contacting the first member, a leg extending from the flange for insertion into a mounting hole in the first member, and a shank extending from the flange in a direction opposite to the leg, wherein the second clip component has a flange for contacting the second member, a tube for receiving the shank therein, and an engagement portion inside the tube, and wherein a tip of the shank of the first clip component has an engagement portion for engaging the engagement portion of the second clip component so that the second member is clamped between the flange of the first clip component and the flange of the second clip component, wherein the engagement portion of the second clip component comprises a pair of pawls, having an inclined posture so tips thereof approach one another in an insertion direction of the first clip component shank into the tube of the second clip component, and wherein the engagement portion of the first clip component comprises a shank head with a shoulder for engaging the tips of the pawls when the pawls return to the inclined posture after the pawls have been bent outward, wherein the shank of the first clip component has a tapered portion near the head to receive the pawls in the inclined posture, wherein the pawls are constructed so that, after being bent outward, they quickly return to the inclined posture and snap in place against the tapered portion when the head passes between the pawls, wherein the flange of the second clip component is formed in a round plate shape to surround the outer periphery of the tube intermediate its length, wherein the tube has a first portion at one side of the flange of the second component constructed to enter a mounting hole in the second member and to guide the shank of the first clip component into the tube, and a second portion at the opposite side of the flange of the second component, in which the engagement portion of the first clip component engages the engagement portion of the second clip component.

2. The clip described in claim 1, wherein the inner diameter of the tube of the second clip component is about 1.5 times or more the outer diameter of the head of the shank of the first clip component for easy insertion of the shank.

\* \* \* \* \*